United States Patent

[11] 3,614,328

[72] Inventors Kenneth Eugene McNaughton;
Richard Lee McNaughton, both of 4216 Corcoran St., Alexandria, Va. 22309;
Arthur E. Morrissette, 8200 E. Blvd. Drive, Alexandria, Va. 20308

[21] Appl. No. 836,052
[22] Filed June 24, 1969
[45] Patented Oct. 19, 1971

[54] AUTOMATIC SUBSCRIBER ANSWERING SERVICE
11 Claims, 1 Drawing Fig.

[52] U.S. Cl. .......... 179/15 AT, 179/18 BE, 340/152 R
[51] Int. Cl. .......... H04j 3/08
[50] Field of Search .......... 179/15 A, 15 AT, 2 DP, 18 BE; 340/152 R, 153

[56] References Cited

UNITED STATES PATENTS 3,197,566 7/1965 Sanders .......... 179/18 (BE)
3,510,598 5/1970 Ballin .......... 179/18 (BE)

*Primary Examiner*—Ralph D. Blakeslee
*Attorney*—John B. Dickman, III

ABSTRACT: The disclosed invention is an apparatus for storing data and automatically disseminating such data in response to an inquiry and effecting a communication connection from the inquiring station to a desired called station accordance with a further instruction form the inquirer. The apparatus generally includes a data storage unit in which information concerning various subscribers is stored. A file selector responsive to an inquiry and the location of the inquiry searches the storage unit and selects the most appropriate information which is then transmitted by an output distributor to the inquirer. The information supplied by the data storage unit in response to the inquiry is also operative to effect a communication link or connection between the inquiring caller and a subscriber or called station.

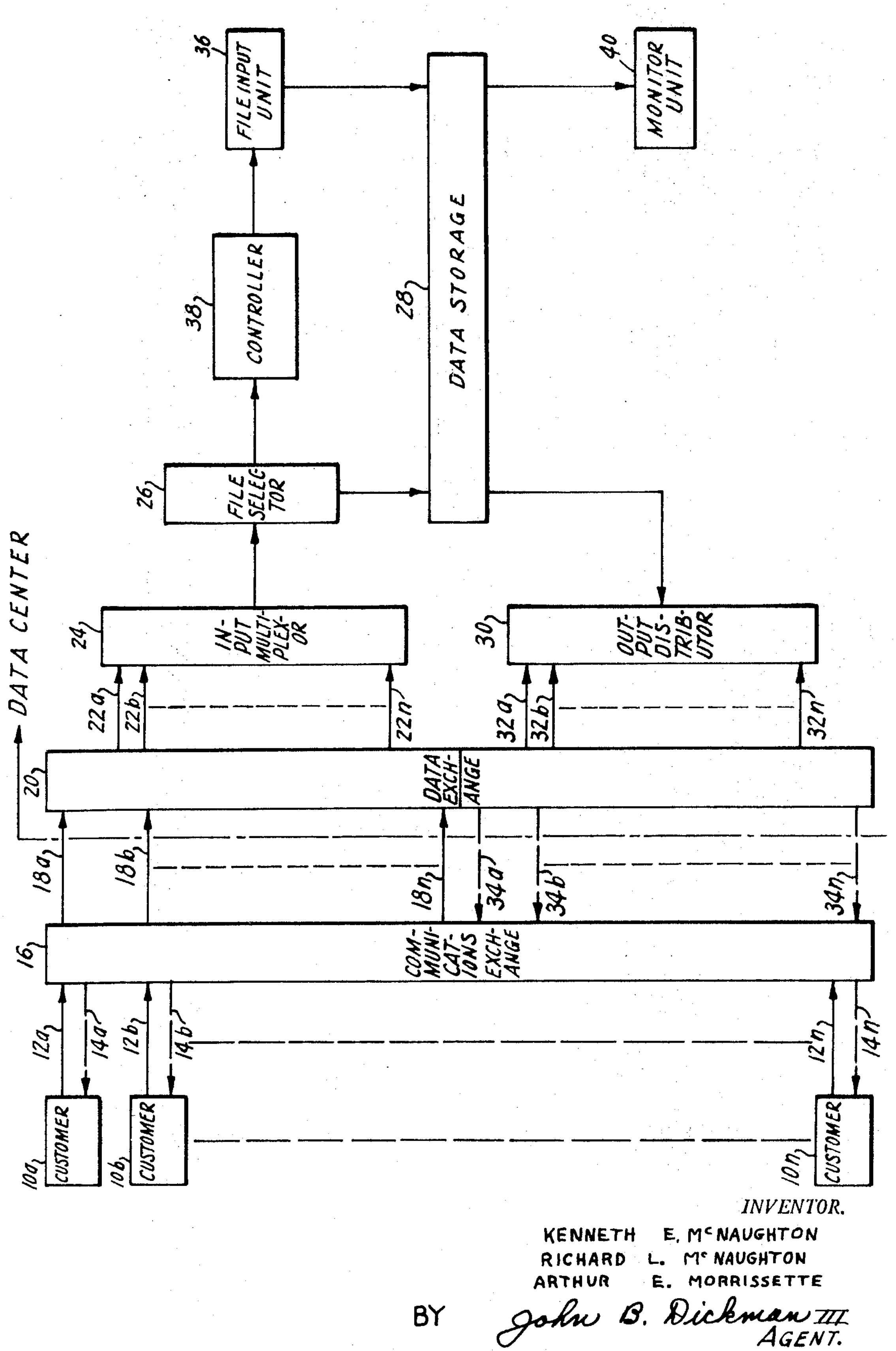
INVENTOR.
KENNETH E. McNAUGHTON
RICHARD L. McNAUGHTON
ARTHUR E. MORRISSETTE
BY John B. Dickman III
AGENT.

AUTOMATIC SUBSCRIBER ANSWERING SERVICE

This invention relates generally to an apparatus for storing and disseminating data and more particularly to an apparatus for receiving a plurality of inquiries concerning stored data, disseminating such data to the respective inquiring caller and effecting a connection from the inquiring caller to a subscriber upon command. The present invention has particular application as an automatic data processing system for recording and disseminating data such as business directory listings, general service listings, classified listings, which data also includes telephone numbers of services requested. The present invention contemplates both audio and video dissemination of data and automatic dialing and transfer service of an originating telephone or radio call to a subscriber's station. In general, the invention contemplates a system in which a large quantity of data can be recorded, stored, and revised at will and in which any portion of the stored data can automatically and efficiently be transmitted in response to an inquiry, and an automatic telephone transfer system for transferring one call to another telephone number.

With the ever growing size of metropolitan areas, a major problem is encountered in locating from an extremely large quantity of information concerning goods and services one or more of such information items which will satisfy a particular individuals need. At present, an individual may desire, for example, to locate a business establishment which has available a particular article of goods. If that article is not one which would be handled by a so called "specialty house," the individual must resort to a large degree to his memory to determine which business concerns may carry that particular article. After searching his memory, the individual must then resort to a directory listing of the pertinent concerns and begin a final search by contacting each of those concerns individually until the particular article is found. This process is, of course, extremely unreliable and time consuming. Furthermore, a large number of directories must be available to that individual if a comprehensive search is to be made. Since these directories cannot be readily updated, any search would undoubtedly produce some inaccurate results.

It is often desirable in making such a search as that described above to find a particular business establishment which is located relatively close to the location of the originating inquiry. In relatively large metropolitan areas, telephone directories, for example, usually cover a relatively large area and do not usually separate subscribers according to a particular area in which they are located. Consequently, it is necessary for the individual to examine each of the addresses of the business concerns listed under a particular category to find the particular concern which is closest to that individual's location. Not only is this process time consuming, but often the individual is not completely familiar with all of the street names in his immediate vicinity and may, consequently, overlook a particular business establishment which is located relatively near him.

A more urgent need exists for rapid searching of such information if some emergency condition arises in a home or business establishment. For example, if some part of the plumbing in a house develops a large leak, the housewife would have to follow a similar search process as that described above in an attempt to locate a plumber who is located relatively close and available at the time to handle the emergency. In such a case, the housewife would beset with the same problems described above and would not only encounter a considerable difficulty in locating the desired service, but would waste a considerable amount of time before such service could be arranged. Another difficulty arises in such a situation if one or more business establishments which are available for service cannot provide immediate service for handling emergencies. Under such conditions in the example concerning a plumbing leak, the housewife would waste additional time making calls to business establishments which could not handle the emergency on a timely basis.

Accordingly, it is an object of this invention to provide an apparatus which can accept data from one or several sources and which can accept data arriving in random sequence and automatically process this information into a coded sequence in a data storage memory unit.

A further object of the present invention is to provide an apparatus wherein the stored data can be deleted or revised from time to time as replacement data is received.

Another object of the present invention is to provide an apparatus that will automatically cross reference data entries in a memory unit of the same service or directory regardless of the series under which listings are included.

Still another object of the present invention is to provide an apparatus which can store an extremely large quantity of data such as any kind of service, business or article such as is listed in service directories, business directories, classified listings which provide an economic means of advertisement and service of all subscribers and to provide a directory and information service on services, businesses, and classified listings to all desiring such information.

It is another object of the present invention to provide a telephone answering service connected in a rotary system and with switching arrangements which are effective to increase traffic handling capacity.

It is yet another object of the present invention to provide a data storage memory unit and dissemination apparatus to enable the recorded data to be automatically and efficiently transmitted audibly to as many callers in an exchange area or a plurality of such areas as can currently initiate calls for such services, business or classified listings, etc.

Still another object of the present invention is to provide a video presentation automatically and simultaneously with audio responses to callers initiating calls for a service, business or classified listing, etc.

A feature of the present invention resides in the provision of a plurality of data storage memory banks, means for selecting desired data from random zones of the memory storage unit, and means for coupling the data to an output line.

A further feature of the present invention resides in the provision of a plurality of speech storage units and control means for selectively and simultaneously coupling the speech storage data to audio and/or video output lines, wherein an audio and/or video presentation will be relayed to the source of the telephone or video phone call.

A further feature of the present invention resides in the provision of an apparatus that will at the same time the audio and/or video response is being made automatically engage an automatic telephone transfer system which will provide an automatic dialing and transfer of the telephone call from the origin of the inquiry to the service, business or listing desired. This feature permits inquiring calls the possibility of transferring their incoming calls to a subscribers number by means of a registering device in a relay set. Simultaneously, the resister activates the desired number, indicates the number by video display, and automatically connects the originating call to the selected service, business or classified listing telephone circuit without the aid of an operator.

A further feature of the present invention resides in the provision of means which will automatically shift a subscriber listing from its appearance in the data storage memory unit to the last appearance only if a call has been transferred from the originating inquiry to the subscriber whose service was requested.

A further feature of the present invention is to provide an apparatus that will automatically shift the trailing appearances in the particular category of service, business or classified listing requested to a ready or leading appearance in the data storage memory unit.

A further object of the present invention is to provide an apparatus that will visually display via a video memory system a listing of services, businesses or classified listings activated by the date from the memory storage units for display at operators positions and at the station of the originating telephone call or inquiry.

A still further feature of the present invention resides in the provision of apparatus that will permit transfer tie-in of the incoming phone call to a second desired number through an automatic dialing system which will retain the originally connected pairs of lines through a central switchboard, but will cause the lines to be a closed circuit system; that is, a circuit that cannot be entered into by a third party until the circuit is broken by one of the other two parties, at which time an automatic signalling device will audibly or visually notify an operator at the switchboard that the line is available for access. This feature will permit a tied together of the original pair of lines for automatic dialing and connection of a second or third service, business, etc.

These and other objects, feature and advantages of the present invention will be more fully realized and understood from the following detailed description when taken in conjunction with the accompanying drawing, wherein the single FIGURE thereon is a block diagram of an automatic subscriber answering service constructed in accordance with the principles of the present invention.

With reference to the drawing, there is shown a plurality of calling stations 10*a*, *b...n* from which an inquiry can be made and a response received. The calling stations 10*A–n* may consist of a telephone, a digital terminal, a video terminal, or a radio terminal. Each of the calling stations 10 are connected by means of an outgoing link 12*A–n* and an incoming link 14*a–n* to a communications exchange 16. The links 12 and 14 may represent either hard wire lines, a radio transmission path, a microwave transmission path, or an electro-optical transmission path, for example, laser transmission. The communications exchange may consist of either a commercial telephone exchange, a private telephone exchange, a radio channel, a television channel, a microwave terminal, or a laser terminal.

The communications exchange 16 is connected by a plurality of lines 18*a–n* to a data exchange 20. If the information supplied to the data exchange 20 is not in digital format, the data exchange 20 converts the information to digital format. If the information is in audio form, it is digitized by known methods and if the information is in the form of a radio signal, a video signal, a microwave signal, or a laser signal, it is demodulated and digitized by the data exchange 20. The information which is converted to digital format by the data exchange 20 is supplied on lines 22*a–n* to an input multiplexer 24. The input multiplexer 24 arranges each of the requests in sequence for service. An output of the input multiplexer is connected to a file selector 26 in which each request is identified and the proper file is selected.

The information pertaining to each subscriber is contained in a data storage unit 28. The information contained in the data storage unit 28 is searched and selected by the file selector 26 in response to proper address information. The storage medium in the data storage unit 28 may consist of a magnetic core, drum, disk or tape memory; integrated circuit memories; thin film memories; cryolectric memories; electro-optical memories; plated wire memories; MOS memories; or electrostatic memories.

The information which is selected from the data storage unit 28 is transmitted to each of the calling stations 10 by means of an output distributor 30, the data exchange 20, and communications exchange 16. In particular, the output distributor 30 is connected by means of a plurality of lines 32*a–n* to the data exchange 20 where the information is converted to either an audio signal, a video signal, a digital signal, or an optical signal in accordance with the particular form of the links 12 and 14. These signals are supplied from the data exchange 20 by means of output lines 34*a–n* to the communications exchange 16, and from the communications exchange 16 along lines 14*a–n* to the calling stations 10*a–n*.

Information is supplied to the data storage unit 28 by means of a file input unit 36 which may consist of a magnetic tape unit, a punched paper tape reader, a punched card reader, an optical reader, or a magnetic ink reader. Both the file selector 26 and the file input unit 36 may be controlled by an operator or controller 38. In order to check the accuracy of the information contained in the data storage unit 28, a monitor unit 40 is provided which may consist of a card or tape punch, a printing device, an audio device, or a video device.

In operation, a calling station makes a connection by means of the communications exchange 16 with the data center. Once this connection is made, a code corresponding to the desired goods or services and the location of the calling station are transmitted to the data center by the corresponding calling station. If the calling station is a digital terminal, the coded information is simply entered directly into the input multiplexer 24. If a calling station is a telephone, as found in a home, for example, this code can be generated by dialing additional digits. Alternatively, this code can be generated by different frequency signals which represent code elements, which signals would be digitized by the data exchange 20 and supplied to the input multiplexer 24. Another alternative approach consists of providing an oral request to an operator who would manually operate the data exchange 20 and convert such an oral request into digital form for transmission to the input multiplexer 24. A still further alternate approach consists of a direct oral request from a customer or caller which will automatically (voice operated) operate the data exchange 20, and convert the request into digital form for transmission to input multiplexer 24. When the particular goods or services are properly identified by the file selector 26, that portion of the data storage 28 which contain those goods or services are selected. If the location of the calling station is also supplied to the file selector 26, only those files will be selected which are within a predetermined range of the calling station.

The data storage unit 28 preferably contains a plurality of audio signal generating devices and video signal generating devices which can supply the information to each of the calling stations 10*a–n*. If a customer at one of the calling stations 10*a–n* desires to be connected with the particular business establishment identified by the information within the data storage unit 28, an additional code can be transmitted via the communications exchange 16, the data exchange 20, and the input multiplexer 24 to the data storage unit 28 to supply the coded information corresponding to the telephone number of that establishment to the communications exchange 16 to effect a connection between a calling station 10 and the particular selected business establishment. Once this connection is made, however, the connection with the data center is not released so that the calling station may make a second or greater number of selections if the first is not satisfactory.

The principles of the invention explained in connection with the specific exemplification thereof will suggest many other applications and modifications of the same. It is accordingly desired that, in construing the breadth of the appended claims they shall not be limited to the specific details shown and described in connection with the exemplification thereof.

The invention claimed is:

1. An automatic subscriber answering apparatus comprising a communications exchange connected to a plurality of calling stations; means for storing a plurality of information items corresponding to subscriber services and telephone numbers; means responsive to information generated by at least one of said calling stations for selecting at least one of said information items from said storage means; means for supplying the selected information item to said one calling station; means for effecting a connection between said one calling stations and a station of a subscriber identified by said information item; and means responsive to information generated by said one calling station corresponding to its location for selecting an information item from said storage means which identifies a subscriber located nearest said one calling station.

2. An automatic subscriber answering apparatus comprising a communication exchange means connected to a plurality of calling stations; means for storing a plurality of information items; means responsive to first information generated by at least one of said calling stations for completing a connection between said one calling station and said means for storing; means responsive to second information generated by said one calling station for selecting at least one information item from said storage means; means for supplying the selected information to said one calling station; and means responsive to information generated by said one calling station for effecting a connection between said one calling station and a calling station identified by said selected information.

3. The invention as defined in claim 2 wherein said plurality of information items comprises identifications of subscriber services and telephone numbers; and wherein the informations generated by said one calling station are generated in a code format.

4. The invention as defined in claim 3 wherein said code format is of the digital type.

5. The invention as defined in claim 3 further comprising data exchange means, between said communication exchange means and said means for selecting, for converting said information generated by said one calling station into digital format.

6. The invention as defined in claim 3 further comprising multiplexer means between said communication exchange means and said means for selecting for sequencing the information received from each calling station.

7. The invention as defined in claim 3 further comprising data exchange means between said means for storing and said communication exchange means for converting the selected information into human comprehensible information.

8. The invention as defined in claim 3 wherein said means for selecting at least one information item from said storage means effects its selection in response to a first discrete information item generated by said one calling station; and said means for effecting a connection between said one calling station and the calling station identified by said selected information effects its connection in response to a second discrete information item generated by said one calling station.

9. The invention as defined in claim 2 wherein said means for selecting at least one information item from said storage means effects its selection in response to a first discrete information item generated by said one calling station; and said means for effecting a connection between said one calling station and the calling station identified by said selected information effects its connection in response to a second discrete information item generated by said one calling station.

10. The invention as defined in claim 9 wherein the first and second discrete information items are in digital format.

11. The invention as defined in claim 9 further including data exchange means connected to said communications exchange means for converting said information generated by said one calling station into digital format, and for converting said selected information into audible information.